United States Patent
Harter

[15] 3,704,003
[45] Nov. 28, 1972

[54] VALVE ASSEMBLY WITH INTEGRAL INLET TUBE AND SADDLE

[72] Inventor: Robert M. Harter, Collins, N.Y.

[73] Assignee: AVM Corporation, Jamestown, N.Y.

[22] Filed: Oct. 30, 1970

[21] Appl. No.: 85,570

[52] U.S. Cl. ............................................. 251/312
[51] Int. Cl. ............................................. F16k 5/04
[58] Field of Search .251/312, 310, 311; 137/625.47, 137/625.48

[56] References Cited

UNITED STATES PATENTS

| | | | |
|---|---|---|---|
| 3,506,239 | 4/1970 | Johnson | 251/310 |
| 1,320,627 | 11/1919 | Long | 137/625.47 X |
| 3,058,718 | 10/1962 | Johnson | 251/310 X |
| 2,973,181 | 2/1961 | Johnson | 251/310 X |
| 3,052,444 | 9/1962 | Kintner | 251/367 X |
| 3,116,756 | 1/1964 | Alderson | 251/367 X |
| 3,170,226 | 2/1965 | Larry | 251/361 X |
| 3,192,613 | 7/1965 | Allen | 251/367 X |
| 3,405,601 | 10/1968 | Clarke | 137/625.47 X |
| 3,430,918 | 3/1969 | Kolze | 251/367 X |

*Primary Examiner*—Samuel Scott
*Attorney*—Strauch, Nolan, Neale, Nies & Kurz

[57] ABSTRACT

A fabricated plug valve assembly comprises a valve body having lateral inlet and outlet openings and a hollow ported plug rotatably mounted within the body between valve open and closed positions where it respectively blocks or permits fluid flow from the inlet opening to the outlet opening. An outlet tube is secured to the body around the outlet opening with its inner end mounting an annular seal engaging the periphery of the rotatable plug, and a tubular inlet unit having at its inner end an integral saddle section terminating in a flange shaped to conform to the body side contour is rigidly secured to the body around the inlet opening.

1 Claim, 4 Drawing Figures

PATENTED NOV 28 1972 3,704,003

INVENTOR
ROBERT M. HARTER

BY Strauch, Nolan, Neale, Nies & Kurz
ATTORNEYS

VALVE ASSEMBLY WITH INTEGRAL INLET TUBE AND SADDLE

This invention relates to plug valves and particularly to valves having fabricated plugs and bodies. In its preferred embodiments the invention will be disclosed as an improvement over the plug valve assembly disclosed in U.S. Letters Pat. No. 3,506,239 issued Apr. 14, 1970.

The present invention is concerned with a valve assembly of this type wherein an inlet tube adapted for end connection to a side opening in the valve body is formed with an integral saddle section shaped to conform to the body side wall contour, and this is the major object of the invention.

Further and detailed objects of the invention will appear in connection with the disclosure including the claims herein.

PREFERRED EMBODIMENTS

Figure 1:
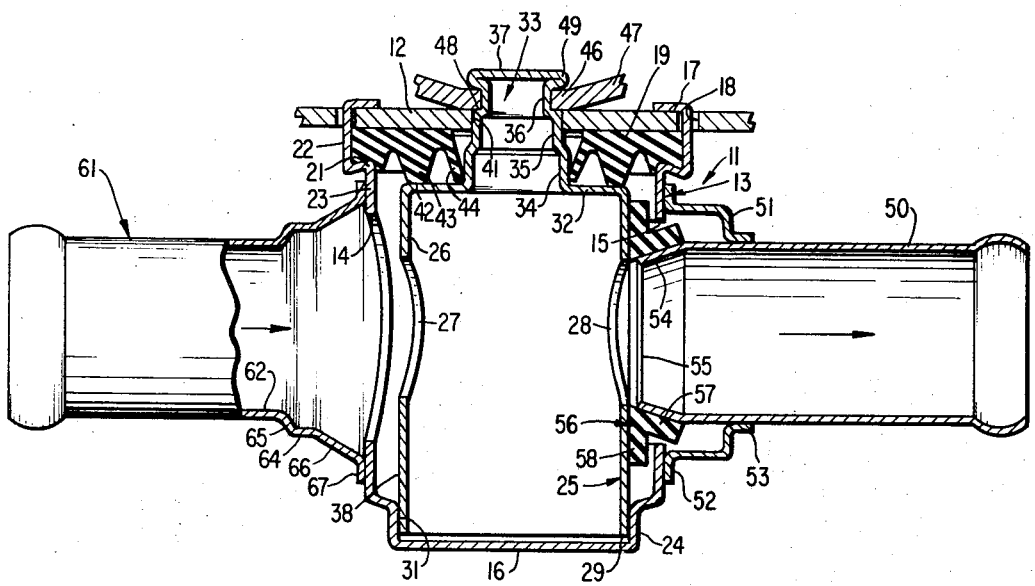
FIG. 1 is a mainly sectional view in side elevation showing a valve assembly according to a preferred embodiment of the invention.

In the preferred embodiment of the invention the valve assembly 11 comprises a top plate 12 which serves as the cover for the open top of a hollow metal valve body 13 having diametrically opposed lateral fluid outlet openings 14 and 15 and a closed bottom wall 16. Body 13 is suspended from plate 12 which also serves to mount the assembly in a desired location as by tabs 17 extending through plate apertures 18 and bent over onto the upper side of the plate.

A resilient annular stem seal 19 is compressed axially all around its outer periphery between the underside of plate 12 and a body shoulder 21 formed between the enlarged diameter upper end 22 of the valve body and a smaller diameter cylindrical portion 23 in which outlet openings 14 and 15 are formed. This forms a fluid tight seal between the upper end of body 13 and plate 12.

The lower end of valve body 13 is turned inwardly and downwardly to bottom wall 16 to form an inwardly open hollow cylindrical boss 24.

A one-piece valve plug and stem member 25 is rotatably mounted within body 13. Member 25 comprises a hollow open bottom, closed top shell 26 of formed sheet metal. Shell 25 preferably is cylindrical and has aligned opposite side openings 27 and 28. Shell 26 is open at its lower end at 29 and it extends with rotative clearance within the inner periphery 31 of boss 24.

The upper end of shell 26 is closed by annular transverse top wall 32 which extends at right angles to the plug axis and upstanding post 33 that is concentric and symmetrical about the plug axis. Post 33 consists of successively reduced diameter portions 34, 35 and 36 and a transverse end wall 37 that extends across the portion 36.

Preferably the entire outer surface 38 of shell may be coated with polytetrafluoroethylene or equivalent corrosion and wear resistant plastic coating.

Integral valve stem 33 projects through the open center of resilient annulus 19 and an opening 41 in plate 21 which is of such diameter to slidably and rotatably accommodate stem portion 35.

The upper side of annulus 19 is flat and flush with the underside of plate 12. The flat annular upper end wall 32 of shell 26 bears slidably against the flat annular surface 42 on the lower end of a resilient integral annular rib 43 projecting from the lower side of the annulus. Inwardly of rib 43, the annulus 19 is formed with another resilient integral annular rib 44 that is of such shape and size as to sealingly slidably surround stem portion 34 in the assembly.

During assembly of the valve, plug member 25 is inserted to thrust stem 33 through resilient rib 44 until wall 32 abuts rib 43 and stem portion 36 is disposed beyond plate opening 41. The apertured internally serrated hub 46 of an operating lever 47 is forced down onto stem portion 36 and pushed down until it abuts stem shoulder 48. Then the projecting upper end of the stem is deformed to the condition shown in FIG. 1 wherein the outer end of portion 36 and wall 37 are deformed and expanded to provide a peripheral ledge 49 extending over lever hub 46 to axially and non-rotatably fix lever 47 upon stem 33. This also fixes the location of valve plug member 25 in the assembly with openings 27 and 28 at the same level as the body side openings.

Plug member 25 may be formed and mounted on plate 12 as disclosed in copending application, Ser. No. 4348 filed Jan. 20, 1970, or as in said U.S. Pat. No. 3,506,239.

Annulus 19 is preferably of the same structure and function as disclosed and claimed in copending application, Ser. No. 4347 filed Jan. 20, 1970.

An outlet tube 50 is mounted on one side of body 13 as by an annular saddle 51 having a radial flange 52 at one end conforming to the shape of body 13 and secured thereto as by brazing and an axial flange 53 surrounding the collar and secured thereto as by brazing.

Inwardly of saddle 51 tube 50 is formed with a converging generally conical tapered end 54 extending through body opening 15 and terminating adjacent the plug in an opening 55 of about the same size as plug opening 28.

A resilient sealing ring 56 is mounted on tapered section 54 of the tube. As shown, ring 56 is generally L-shaped in normal radial section with one resiliently stressed arm 57 snugly and resiliently surrounding the smooth tapered outer surface of the tube end. The other resiliently stressed arm 58 of ring 56 engages plug shell 26 and its inner surface is shaped to conform snugly with the shell contour. Arm 57 may be bonded to the tube end so as to be fixed axially of the tube. Arm 58 engages shell 26 with sufficient force to provide a fluid tight seal around the opening 28 when the valve is open, especially when backed with inlet fluid pressure, but it does not materially impede rotation of the plug.

A seal ring of this type is disclosed in Letters Patent No. 3,506,239 issued April 14, 1970.

Figure 2:
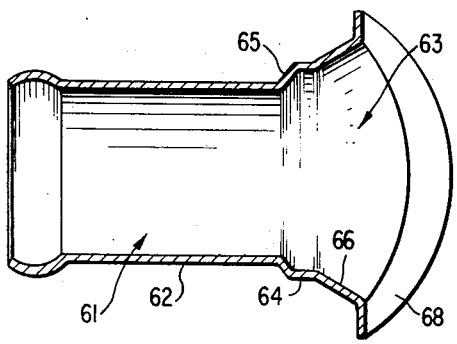
FIG. 2 is a section on line 2—2 of FIG. 3 showing the integral inlet tube and saddle unit apart from the assembly.
Figure 3:
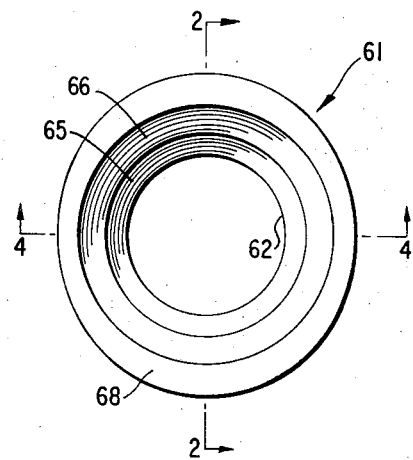
FIG. 3 is an end elevation of the unit of FIG. 2.
Figure 4:
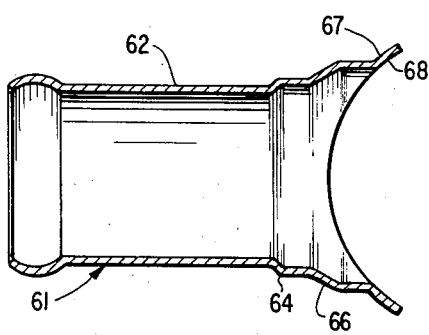
FIG. 4 is a section on line 4—4 of FIG. 2.

A one-piece integral inlet tube unit 61 is mounted over body opening 14 at the other side of the body. As shown in FIGS. 2–4 the tube unit 61 consists of a cylindrical tube section 62 and a flared saddle section 63. The saddle section comprises a short cylindrical region 64 of slightly greater diameter than tube 62 joined to tube 62 by a radial shoulder 65, and a generally conical tapered region 66 extending from a smaller end at section 64. Tapered region 66 is connected at its larger end by a region 67 of complex shape (FIG. 4) to an annular cylindrically curved outwardly concave flange 68 that in the assembly (see FIG. 1) conforms to the shape of body 26 around opening 14 and is secured thereto as by brazing. As shown in FIGS. 1 and 4, region 67 is mainly cylindrical of maximum length at its horizontal midsection and of minimum length at its vertical midsection.

The body and the hollow plug, and the inlet and outlet structures are suitably formed from sheet steel by stamping and like process steps.

While the invention has been described in an embodiment having one inlet and an outlet, it is equally applicable to a valve assembly as described and also having a second inlet through bottom wall 16 as in the form disclosed in said U.S. Pat. No. 3,506,239.

The invention may be embodied in other specific forms without departing from the spirit or essential characteristics thereof. The present embodiments are therefore to be considered in all respect as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A plug valve assembly comprising a sheet metal cylindrical valve body having a lateral inlet opening and a lateral outlet opening, a hollow sheet metal plug member rotatably mounted within said body between valve closed and valve open positions where it respectively blocks or permits fluid flow from the inlet opening to the outlet opening, there being side openings in said plug member aligned with said lateral body openings in the open valve position, a sheet metal outlet tube secured to said body around said outlet opening and having an inner end terminating within the body adjacent said rotatable plug member, an annular resilient seal disposed between said inner end of the outlet tube and the periphery of said rotatable plug member, and a tubular sheet metal inlet unit mounted on said body comprising an outer cylindrical tube section formed integrally at its inner end with an outwardly flared enlarged saddle section that diverges with increasing diameter with respect to said tube section, and an integral external continuous flange extending all around the inner end of said saddle section, said flange being axially cylindrically concave and shaped to the contour of said body around said inlet opening and being secured directly in surface engagement with said body all around said inlet opening.

* * * * *